Figure 1:
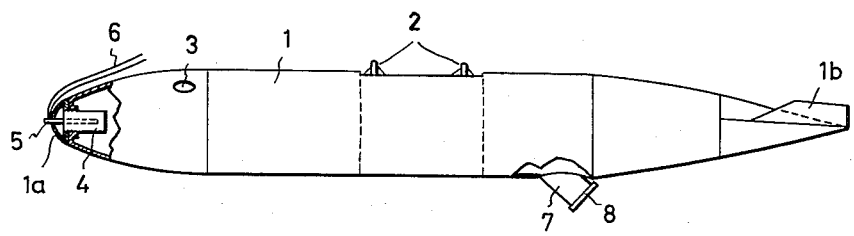

Nov. 30, 1965     H. ORDEMANN ETAL     3,220,674

SPREADING ATTACHMENT FOR AN AIRBORNE VEHICLE

Filed July 6, 1964

INVENTOR.
Helmut Ordemann, Hartmut Bussewitz
BY Kelman and Berman
Agents

United States Patent Office 3,220,674
Patented Nov. 30, 1965

3,220,674
SPREADING ATTACHMENT FOR AN
AIRBORNE VEHICLE
Helmut Ordemann and Hartmut Bussewitz, Donauworth,
Germany, assignors to Siebelwerke-Atg G.m.b.H., Donauworth, Germany
Filed July 6, 1964, Ser. No. 380,349
Claims priority, application Germany, July 16, 1963,
S 45,603
7 Claims. (Cl. 244—136)

This invention relates to the spreading of chemicals from aircraft, and more particularly to a spreading attachment for an airborne vehicle.

It is a common practice to distribute pesticides, fertilizer, and similar agricultural chemicals from the air over crop land and forests. The material is discharged in liquid or finely comminuted solid compositions from aircraft, such as airplanes or helicopters, which are structurally modified or especially constructed for the purpose. A storage vessel for the material to be spread is mounted within the fuselage of the aircraft at or near its effective center of gravity. The liquid or powder composition is discharged outward from the fuselage through spraying nozzles under the fuselage under the wings which are connected by tubing to the storage vessel.

The material is discharged from the nozzles under gas pressure, and is atomized by the air stream which is caused by the movement of the aircraft or by its propellers. It is conventional to equip such aircraft with pumps driven by the engine or by propellers in the airstream, or with tanks of compressed air for providing the necessary pressure fluid.

An object of the invention is the provision of a spreading attachement which is self-contained and capable of being used with any type of existing aircraft virtually without structural modification of the same.

Another object is the provision of a spreading attachment which is of such simple and rugged construction that it is practically free from deterioration and breakdown in service.

More specifically, the invention aims at a spreading attachment which is free from moving structural elements such as valves, and which can be made at low cost from materials which resist chemical attack by corrosive chemicals to be spread therefrom.

Yet another object is a simple method of control of the spreading attachment by the pilot of the aircraft.

A further object is the avoidance of undesired discharge of chemicals after a tract of crop land or forest has been covered.

With these and other objects in view, the spreading attachment of the invention includes a vesesl of streamlined external shape which is releasably attached to an airborne vessel for operation. A charging port on the vessel permits the same to be filled and refilled with the material to be spread. An outlet conduit leads outward from the vessel cavity. Discharge of the material through the outlet conduit is produced by release of a propellant gas from a releasably mounted, replaceable cartridge mounted within the vessel when an electrically operated firing mechanism is energized by the pilot.

Figure 2:
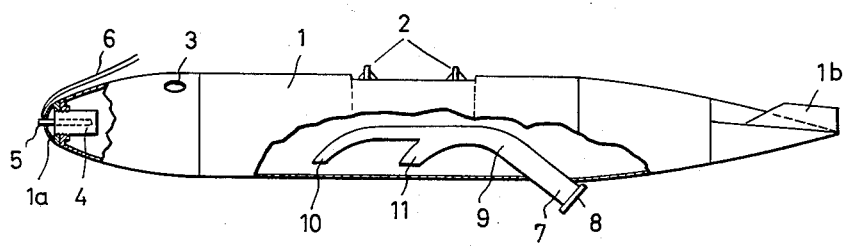

Other features and many of the attendant advantages of this invention will be readily appreciated as the same becomes better understood by reference to the following detailed description when considered in connection with the accompanying drawings wherein:

FIG. 1 shows an embodiment of the invention in side-elevational view, portions of the vessel being broken away to reveal internal structure; and FIG. 2 shows a modified embodiment in a view corresponding to that of FIG. 1.

Referring now to the drawing in detail, there is seen a streamlined and generally torpedo-shaped vessel 1 having a blunt leading head portion 1a which is releasably attached to the remainder of the vessel, and stabilizing fins 1b on the tapering trailing end portion. Rings 2 mounted on the vessel 1 above its center of gravity normally engage corresponding hook-shaped fastenings on a non-illustrated aircraft. The spreading attachment illustrated may thus be suspended under the wings or under the fuselage of an airplane or under corresponding portions of a helicopter or other airborne vehicle.

A normally closed charging port 3 on the top of the vessel near its front end permits the vessel cavity to be filled with an amount of spraying or dusting composition sufficient for the area that it is intended to cover.

A propellant cartridge 4 is releasably mounted on a bulkhead which constitutes the front wall of the vessel cavity, and is attached to the releasable head portion 1a. The cartridge contains black powder or a similar explosive composition which generates a large amount of gaseous fluid when fired. The cartridge is detonated by a firing mechanism 5, conventional in itself, which is actuated by electric current. The electrical circuit of the firing mechanism is indicated by a pair of conductors 6, but will be understood to be connected to the electrical system of the aircraft for current supply, and to include a switch on the pilot's control board.

The bottom wall of the vessel 1 is apertured near the trailing end, and a generally cylindrical outlet pipe 7 is sealingly attached to the wall so as to lead outward of the vessel in a direction which is obliquely downward and rearward in the illustrated normal operating position of the spreading attachment. The outer orifice of the outlet pipe 7 is sealed by a replaceable frangible diaphragm 8 whose bursting strength is matched to the propellant charge of the cartridge 4 in such a manner that the diaphragm will open the outlet pipe 7 when the pressure within the vessel 1 approaches its maximum during release of the propellant.

The outlet pipe 7 is mounted on that portion of the bottom wall in the vessel 1 which is at the lowest level in normal horizontal flight. The contents of the vessel 1 are thus completely discharged during each spreading flight. The rate of discharge is precisely controllable by selection of the effective flow section of the outlet pipe 7 to match the speed of the aircraft and the rate of application per unit area of the land to be covered. A further measure of control is available by the choice of a suitable propellant charge.

If the material to be spread is a liquid which tends to cling to the walls of the vessel 1, some liquid may be retained on the walls of the vessel at the end of a spreading run. The liquid then gradually descends to the bottom wall, and may be discharged by gravity either while the aircraft returns to its base or after landing on the ground. This is usually undesired. The modified spreading attachment illustrated in FIG. 2 avoids undesired discharge of residual material from the vessel.

The modified apparatus has a torpedo-shaped vessel 1 equipped with rings 2 for suspension from an aircraft, a charging port 3, propellant cartridge 4, and firing mechanism 5 which are substantially identical with the corresponding elements described above with reference to FIG. 1, and operating in the same manner. The outlet pipe 7 projects from the bottom wall of the vessel 1 in a normally downward and rearward direction, and is closed by a frangible diaphragm 8 until the diaphragm is broken by internal gas pressure in the vessel 1.

The modified spreading attachment has a take-off tube 9 which is integral with the outlet pipe 7 and extends inward of the vessel 1 from the outlet aperture thereof in an obliquely upward and forward direction. At the approximate level of the vessel axis, the take-off pipe 9 is bent into a forward direction approximately parallel to the bottom wall of the vessel, and its free front end is again turned obliquely downward toward an intake orifice 10 which spacedly faces the bottom wall. A branch of the take-off tube 9 extends obliquely in a forward and downward direction and terminates in an intake orifice 11 axially intermediate the orifice 10 and the outlet pipe 7.

The pressure of the propellant gas drives the liquid contents of the vessel 1 through the orifices 10, 11 into the take-off tube 9 and outward through the outlet pipe 7 when the cartridge 4 is discharged by the firing mechanism 5. When the liquid level in the vessel 1 drops below at least one of the orifices 10, 11, the gas pressure is released. The remaining liquid is held within the vessel 1 and cannot be accidentally discharged where it is not intended.

Quite surprisingly, it has been found that the amount of liquid composition remaining in the vessel 1 after exhaustion of propellant pressure is smaller in the apparatus illustrated in FIG. 2 than in that shown in FIG. 1 under otherwise identical conditions.

The modified embodiment of the invention illustrated in FIG. 2 is particularly useful for the spreading of selective herbicides whose application must be limited to the crop to be protected, and which may cause serious damage to other crops. The spreading attachment of the invention has been described with reference to its use with agricultural chemical compositons, and more specifically with liquid compositions, but the invention is not limited to the specific use, nor to the specific chemicals described with reference to the drawing. Powder compositions may be spread from the same attachments, and the attachments may be employed to advantage in such other applications as the spreading of fire fighting chemicals from the air.

It should therefore be understood that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A spreading attachment for an airborne vehicle comprising, in combination:
    (a) a vessel of streamlined external shape, said vessel enclosing a cavity adapted to receive a material to be spread and being formed with a charging port;
    (b) a closure normally closing said port;
    (c) attaching means on said vessel for releasably attaching the same to an airborne vehicle;
    (d) an outlet conduit mounted on said vessel and communicating with said cavity, said conduit projecting in a downward direction from said vessel into the atmosphere when the vessel is attached to said vehicle by said attaching means;
    (e) mounting means for mounting a source of propellant gas in said vessel;
    (f) electrically operated firing means for releasing propellant gas from a source mounted by said mounting means into said cavity; and
    (g) frangible diaphragm means normally blocking said outlet conduit and responsive to the pressure of the propellant gas released by said firing means for opening said conduit.

2. An attachment as set forth in claim 1, wherein a portion of said vessel constitutes the bottom wall of said cavity, said conduit passing outward through said bottom wall and having a take-off portion extending into said cavity, said take-off portion being spaced from said bottom wall.

3. An attachment as set forth in claim 2, wherein said take-off portion is elongated and has two longitudinally successive sections, one of said sections sloping obliquely away from said bottom wall inward of said cavity, and the other section sloping toward said bottom wall and having a free end spaced from said wall and communicating with a portion of said cavity.

4. An attachment as set forth in claim 3, further comprising a branch conduit having one end portion communicating with said take-off portion, and another end portion communicating with another portion of said cavity, said other end portion being spaced from said one end portion in a direction toward said bottom wall and being spaced from the latter, and said portions of said cavity freely communicating with each other.

5. An attachment as set forth in claim 4, said free end and said other end portion each being formed with an orifice facing said bottom wall.

6. An attachment as set forth in claim 2, wherein said take-off portion is formed with an orifice open to said cavity and facing said bottom wall, said orifice being spaced from said bottom wall.

7. An attachment as set forth in claim 1, further comprising an explosive charge releasably mounted by said mounting means in said vessel and connected to said firing means for detonation thereby, said charge constituting said source of propellant gas.

References Cited by the Examiner
UNITED STATES PATENTS

| | | | |
|---|---|---|---|
| 1,604,290 | 10/1926 | King | 244—136 |
| 2,408,774 | 10/1946 | Goddard et al. | 244—136 X |
| 2,507,069 | 5/1950 | Vincent | 244—135 |
| 2,902,822 | 9/1959 | McKiernan | 60—39.48 X |
| 2,940,256 | 6/1960 | Conyers | 60—39.48 |
| 2,943,673 | 7/1960 | Hickman | 158—28 |
| 2,955,787 | 10/1960 | Ray et al. | 244—135 |
| 3,057,588 | 10/1962 | Kolbe | 244—135 |
| 3,097,766 | 7/1963 | Biehl et al. | 60—39.48 X |

FERGUS S. MIDDLETON, *Primary Examiner.*